O. A. ROSS.
ELECTRIC ARC LAMP.
APPLICATION FILED NOV. 25, 1904.

1,032,946.

Patented July 16, 1912.

Witnesses:

Inventor:
Oscar Arthur Ross

O. A. ROSS.
ELECTRIC ARC LAMP.
APPLICATION FILED NOV. 25, 1904.

1,032,946.

Patented July 16, 1912.

Witnesses:—

Inventor:
Oscar Arthur Ross

O. A. ROSS.
ELECTRIC ARC LAMP.
APPLICATION FILED NOV. 25, 1904.

1,032,946.

Patented July 16, 1912.
6 SHEETS—SHEET 5.

Witnesses:-

Inventor:-
Oscar Arthur Ross

UNITED STATES PATENT OFFICE.

OSCAR ARTHUR ROSS, OF CHICAGO, ILLINOIS, ASSIGNOR, BY MESNE ASSIGNMENTS, TO GENERAL ELECTRIC COMPANY, A CORPORATION OF NEW YORK.

ELECTRIC-ARC LAMP.

1,032,946.	Specification of Letters Patent.	Patented July 16, 1912.

Application filed November 25, 1904. Serial No. 234,222.

*To all whom it may concern:*

Be it known that I, OSCAR ARTHUR ROSS, a citizen of the United States, residing at Chicago, Cook county, Illinois, have invented a certain new, useful, and Improved Electric-Arc Lamp; and I do hereby declare the following to be a full, clear, and exact description of the invention, such as will enable others skilled in the art to which it appertains to make and use the same.

My invention relates to improvements in electric arc lamps, and has special reference to those arc lamps which are adapted for use on constant potential circuits, although, as will hereinafter appear, numerous features of my invention are capable of use in alternating current arc lamps.

The accompanying drawing illustrates embodiments of my invention as follows:—

Fig. 2 is a similar sectional elevation on the line $2^v$—$2^v$ of Fig. 1; Fig. $2^2$ is a detail of a binding post; Fig. 3 is an enlarged horizontal, sectional detail on the line $3^x$—$3^x$ of Fig. 1; Fig. 8 is an enlarged detailed view of the positive carbon terminal or holder; Fig. $8^a$ is a plan view of the terminal; Fig. 9 is a modification thereof; Fig. 10 is a detailed sectional view of the diffusing cap or hood belonging to the arc-inclosing globe.

Like numerals and reference letters indicate like parts throughout the drawings.

This arc lamp may be briefly described as comprising the frame, the casing, the arc-inclosing globe, the heat dissipating closure for the globe, the carbon pencil clutch, the operating solenoid, the dash pot therefor, the carbon pencil holding and guiding devices, the resistance member, the binding posts and the switch. For the sake of clearness, the lamp will be described under these heads.

The arc lamp frame, has for its principal members the two rods, 2—2, the plate or part, 3, of insulating material, and the top metal casting or cross-plate, 4.

The object related to this portion of my invention is to provide a light, strong, simple and non-corrosive lamp frame which shall be of such form that its expansion and contraction shall not detrimentally affect the working of the movable parts of the lamp.

A further detail object is to provide a lamp in which the lower part of the frame shall be constituted of insulating material, and shall form the top of the arc-inclosing globe or chamber. The rods, 2—2, comprise steel rods, 2', incased in brass tubes.

Figures 1, 5:
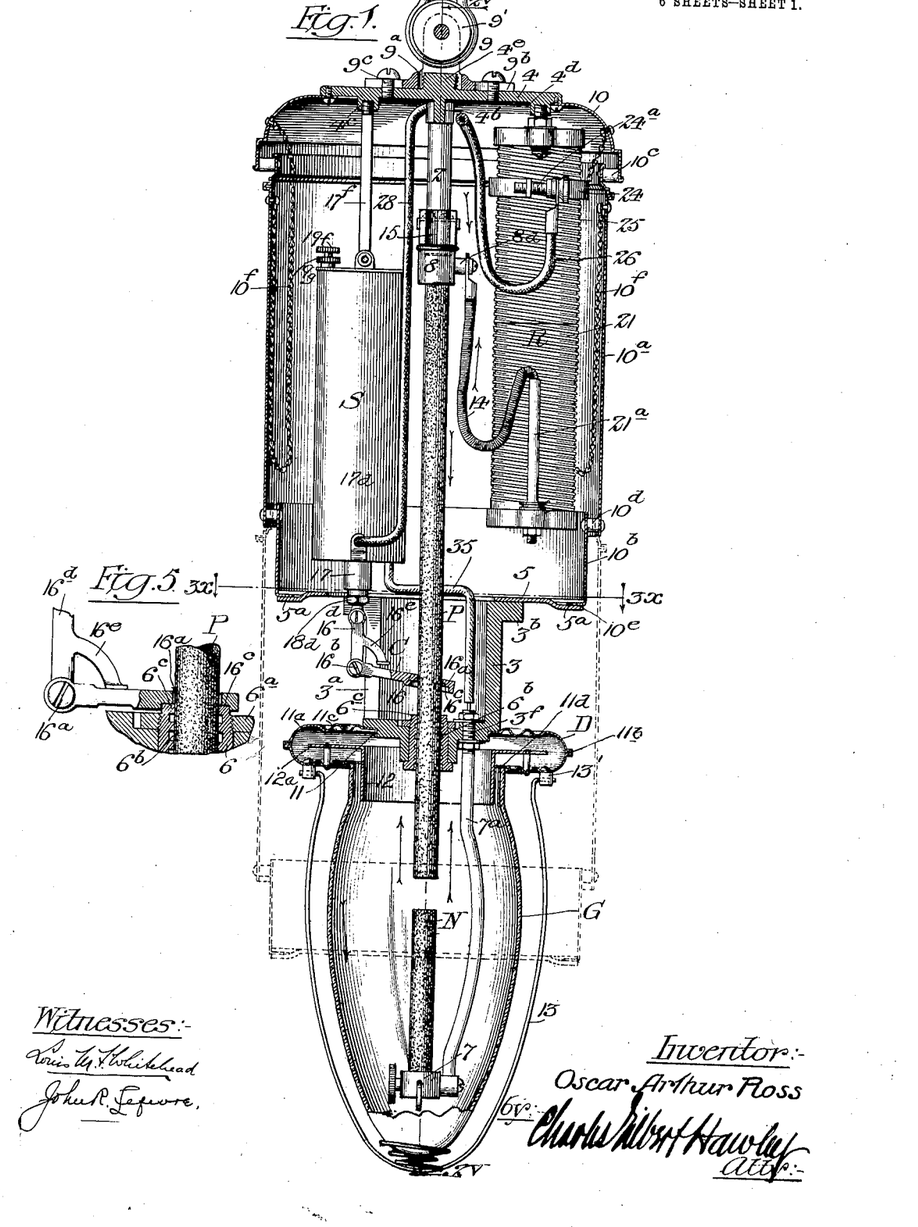
Figure 1 is a vertical, sectional elevation of an electric arc lamp embodying my invention.
Fig. 5 is an enlarged detailed view of the positive carbon pencil clutch, and the gas check on the arc-inclosing globe.

The bottom of the lamp frame presents the appearance of a cup or sleeve having a closed bottom. This cup is composed of porcelain and is provided with an opening, $3^a$, in its side, and a top flange, $3^b$, provided with bolt-holes, $3^c$. The opening is intended to accommodate the clutch mechanism, hereinafter referred to. The flange, $3^b$, holds the metal plate or ring, 5, secured by bolts, 5'. The frame bottom, 3, is a molded part, and at its lower end is provided with a central hole, $3^d$, and eccentric holes, $3^e$, for the gas check sleeve, 6, and the lower ends of the rods, 2'. The rods are secured by the nuts and washers, $2^a$—$2^b$, and the gas check, 6, having a shoulder on its lower end, is secured by a nut, $6^a$, preferably accommodated in a recess provided in the part, 3. The gas check sleeve serves to guide the positive carbon, P, of the lamp, and consists in a metal or lava sleeve, provided with a plurality of internal grooves, $6^b$. The upper end of the gas check, $6^c$, extends slightly above the nut, $6^a$, and is slightly tapered or rounded, as shown in Fig. 5. In addition to holding the gas check and the rods, the part, 3, is provided with an eccentrically placed opening, $3^f$, to receive the upper end of the supporting rod, 7ª, belonging to the negative carbon-holder, 7. The rod, 7ª, is secured by a nut on each side of the bottom of 3, and is properly a part of the lamp frame. 8he top plate, 4, of the frame, is preferably circular, and on its lower side is provided with threaded bosses, 4ª, to receive the threaded upper ends of the rods, 2'. It will be seen that when the nuts, 2ª, are tightened, the frame bottom, 3, and top, 4, will be drawn against the ends of the tubes or rod sheathings, 2, making a very rigid structure.

Figure 16:
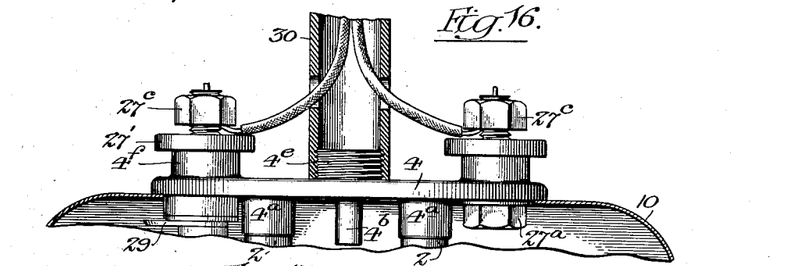

4ᵇ is a bumping lug, on bottom of plate, 4, to limit the upward stroke of the positive carbon block or connector, 8, hereinafter described. The bottom of the plate, 4, is also provided with internally threaded bosses, 4ᶜ, and 4ᵈ, for supporting the clutch actuating solenoid and the resistance member of the lamp. The plate, 4, has a threaded lug, 4ᵉ, on its top, and is also provided with holes and bosses, 4ᶠ, for the lamp binding post. 4ᵍ is another boss on plate, 4, to receive the shaft of the lamp switch. The lamp frame properly includes the yoke or block, 9, containing the porcelain hanger-spool, 9'. This block, 9, has a central opening, 9ª, of greater diameter than the central stud, 4ᵉ, and its base contains slots, 9ᵇ, for the fastening screws, 9ᶜ. The block, 9, is shiftable on the top of the plate, 4, and by adjusting the same, any lack of balance within the lamp may be compensated and the lamp, therefore, caused to hang upon a true vertical line. When it is not desired to hang the lamp by the block, 9, said block is removed, and a threaded conduit pipe is screwed onto the stud, 4ᵉ, to support the lamp, as shown in Fig. 16. A further way of supporting the lamp will be described hereinafter, in connection with the binding posts thereof. By making the bottom of the lamp frame of porcelain, the upper part of the lamp which contains the arc establishing and regulating magnet is practically insulated both electrically and thermally from the lower parts of the lamp.

The lamp casing, comprises the sheet metal spinning, 10, and the cylindrical parts, 10ª and 10ᵇ. The part 10ª, is provided with several lugs, 10ᶜ, serving to center the same within the lower flange of the spinning or hood, 10, and the part 10ᵇ, which is of less diameter than the part, 10ª, is connected thereto by a plurality of large-bodied rivets, 10ᵈ. The parts of the casing overlap downwardly, and large annular openings are provided for the circulation of air within the casing. The spinning or hood, 10, is secured to the plate, 4, and the remainder of the casing is supported by the engagement of a notched flange, 10ᵉ, with the struck down lugs, 5ª, on the metal ring, 5, belonging to the lamp frame, see Figs. 1, 2 and 3. In putting the casing in place, the same is raised, and the notches in the casing are placed opposite the lugs, 5ª, so that the flange may rise against the under surface of the ring, 5. The casing is then twisted or turned and thereby locked. Chains, 10ᶠ, are used to support the casing when dropped to uncover the working parts of the lamp. This casing is extremely simple in form, and without recourse to hinged parts, permits easy and full access to the interior of the lamp.

The arc-inclosing means, comprises the usual deep, slender glass globe, G, and the stoppering device or closure, D, which latter differs from all others in form and function. It is generally conceded and stated that fully one-half the cost of maintaining inclosed-arc lamps, lies in the expense of cleaning the globes and replacing those which are cracked or melted or warped by the great heat of the electric arc. It is also well-known that the effective candle power of an arc lamp of the inclosed-arc type is greatly reduced by the deposition of carbon and other residual products upon the inner walls of the globe. In the ordinary arc lamp, this coating which obscures the light, becomes apparent within a few hours after the lamp is placed in service, and by the time a set of carbons has been consumed, becomes so thick and heavy as to seriously cut down the efficiency of the lamp. The residue deposited on the glass is commonly called soot, and is difficult to remove except by a chemical process.

The primary object of this invention is to provide an inclosed arc lamp which may be operated for long periods without the formation of an obscuring deposit upon the glass globe, so that the lamp may be operated with unvarying efficiency, and to this end I employ in connection with the glass globe, which is a poor conductor of heat, a heat dissipating device D of large area composed of metal that is an excellent conductor of heat, whereby, without materially adding to the cubical capacity of the inclosing globe or chamber, the radiatory capacity is so increased as to prevent the attainment of a dangerously high temperature by the gases within the globe, and which would or might cause the cracking or melting of the globe. I have found the construction herein shown to be adequate and efficient, nevertheless, my invention broadly includes any combination of glass and metallic elements which inclose a limited volume of the products of combustion, and which by providing an adequate radiatory path for the escape of the heat from the arc, operate to maintain a comparatively low temperature within the space or chamber.

Figures 7, 7A, 8, 8A, 9, 10:
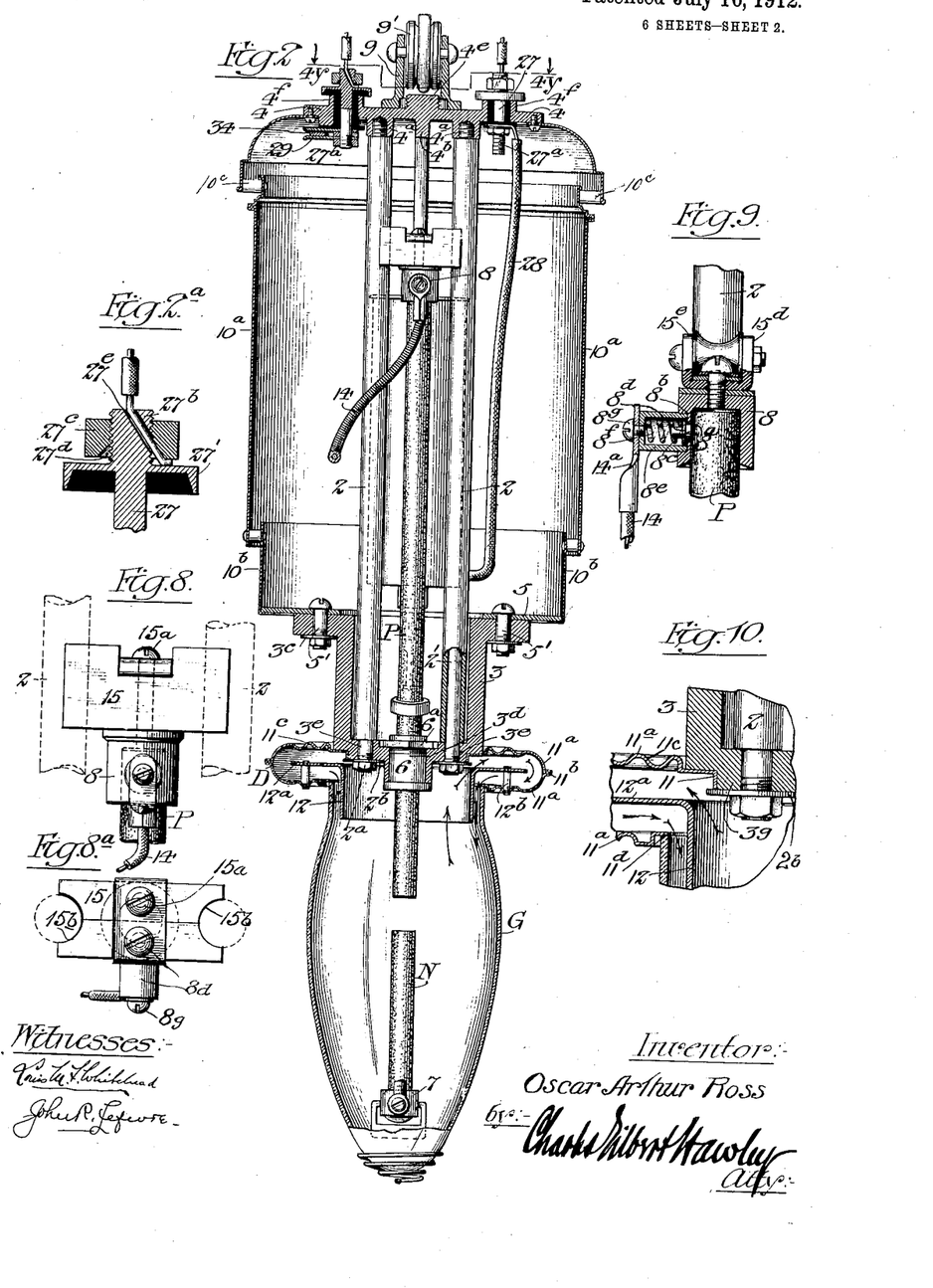

Proceeding now to a description of the preferred form of the heat-dissipating globe closure, D, it will be seen to comprise a thin-walled metallic chamber of large superficial area. It has a large opening in its bottom and rests upon the top or upper end of the globe, G. The upper part of the metallic closure is provided with an opening, and a flange 11, which is forced upon the reduced shouldered parts, 3$^g$, of the insulator, 3. As shown in Figs. 2 and 10, the washers for the rods, 2, project beyond the part, 3$^g$, and support the globe closure or hollow metal ring. The closure is preferably formed of thin sheet copper, comprising two concave stampings or spinnings, 11$^a$—11$^a$ connected by a rolled seam, 11$^b$. Both parts are provided with a plurality of corrugations, 11$^c$, to increase the radiating surfaces thereof. The space inclosed by the heat dissipating or depositing chamber, being bounded by two shallowly dished metal plates, has the general form of a lenticular body of revolution produced by the rotation of an ellipse of large eccentricity about its vertically disposed minor axis. This gives to the heat dissipating chamber a large surface relatively to its cubical contents; one of the exposed surfaces is substantially in the plane of the globe opening and another exposed surface is in a plane above that of the globe opening. The further fact that these surfaces project laterally beyond the widest part of the arc inclosing globe, and, so to speak, overhang the globe, still further enhances the heat dissipating property of the chamber, since in this manner a considerable part of the chamber space is beyond the lines of heat radiation from the globe space. The thin edge 11$^d$ of the lower part, is quite flexible, and resting firmly upon the edge of the globe, forms a tight joint therewith. This joint, however, is quick to open and permit the escape of the contained gases in event their pressure becomes excessive.

The operation of the heat-dissipator or radiator, while not dependent thereon, is enhanced and rendered more certain by the employment of the division device, shown in Figs. 1, 2 and 10, and comprising the short tube, 12, provided with a wide flange, 12$^a$. The tube is of less diameter than the top of the globe, leaving an annular space between the two parts. The flange, 12$^a$, is smaller than the heat-dissipating chamber, and is supported midway therein by a plurality of lugs or rivets, 12$^b$. In this manner the upper part of the globe and the heat-radiating chamber are divided into two channels and the hot gases rising from the arc will be caught within the tube, 12, and caused to flow over and around the dividing or partition flange, 12$^a$, finding their return circuit and escape through the smaller space between the globe and the tube, 12. The gases which enter the hollow closure or radiator quickly part with their heat, deposit the solidifiable matter there, and return to the lower part of the globe at a much reduced temperature. The effect of this device is to reduce the temperature within the globe to the extent of several hundred degrees, and while the globe still remains hot enough to prevent the deposition of any appreciable amount of solidifiable matter that may have escaped deposition in the radiating chamber, it is not hot enough to cause the baking of the slight deposit which it may receive. The soot is for the most part deposited upon the under-surface of the insulator, 3, and upon the walls of the radiator, and that which returns to the globe is so far cooled and condensed as to be precipitated, and accumulates as a fine, loose powder in the bottom of the globe. In addition to the cooling effects of the novel globe closure, it should be noted that the dividing device employed therein has the effect of causing the gases to circulate rapidly within the globe, resulting in the exposure of the coolest gases upon the inner walls of the glass globe. When the dividing device is omitted, the passage between the globe and the heat dissipating chamber is still practically annular in form, because the cup 3, with its closed bottom, projects downwardly into the heat dissipating chamber. The downward moving currents of gas tend to scour or free the surface of the globe from particles that may be precipitated thereon, and furthermore, by being caused to descend to the bottom of the globe undoubtedly part with a certain proportion of their heat by radiation through the coolest portions of the globe.

The glass globe may be supported in any suitable manner, the usual spring wire bail being preferred. The upper ends of the bail are hooked into lugs, 13′, preferably on the bottom of the heat-dissipator or radiator. It will be obvious that the form, contour and construction of the radiator may be changed according to the necessities of peculiar lamp designs, the only caution to be observed being that it should be of very small cubical capacity and of proportionately large superficial area. The best results are secured when thin sheet metal is used in the construction of the device and when the area or radiating surface thereof closely approximates the area of the glass globe. But my invention is not confined to such proportions or to any particular kind or shape of hollow or large surfaced device furnishing the adequate path or medium for the radiation of arc heat, and closing the globe. It will also be obvious that this feature of my invention is capable of utilization with arc-inclosing globes of other shapes.

Figure 18:
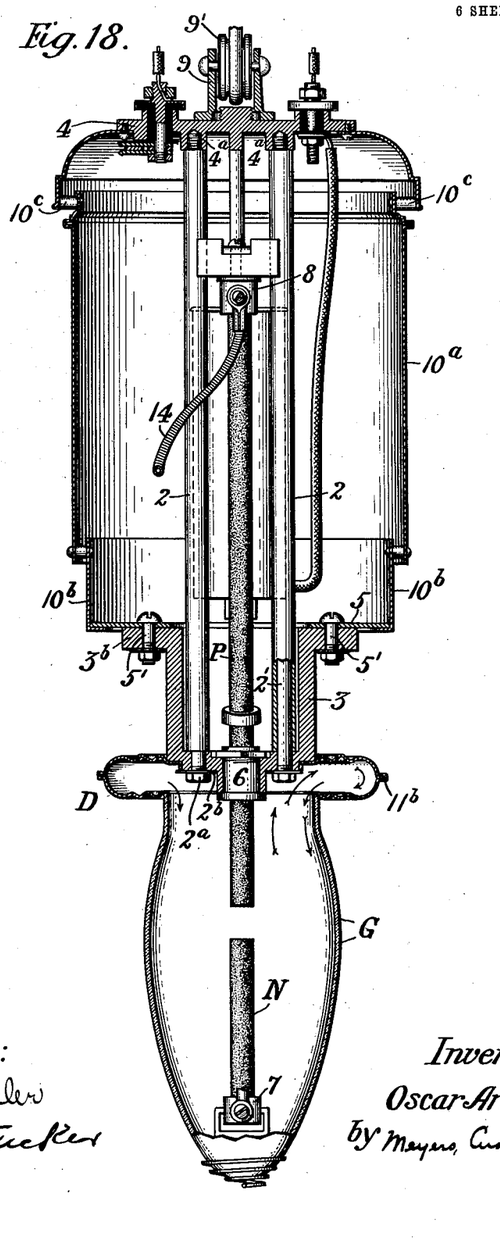
Fig. 18 is a vertical sectional elevation similar to that of Fig. 2, with the top part of the lamp omitted and with the heat-dissipating chamber simplified.

When the division device comprising the short tube 12 provided with the wide flange 12ᵃ is dispensed with, as hereinbefore stated, the structure takes the shape indicated in Fig. 18, which is otherwise the same as that shown in Figs. 1 and 2. The arrows indicate the course of the ascending and descending gases which, as will be seen, remain substantially the same as in the structures shown in Figs. 1 and 2. But, whereas, when the division device is used the paths of the ascending and descending gases and other products of combustion are in a manner mechanically separated, no such mechanical separation takes place in the construction shown in Fig. 18. The wide unimpeded opening between the mouth of the glass globe and the mouth of the heat dissipating chamber, which practically coincide, permits the ascent of the gases and other products of combustion from the arc within a limited region immediately surrounding the arc and electrodes, and at the same time permits the descent of the gases within the region close to the walls of the globe, without any mechanical separation of the two paths.

The carbon pencil holding parts comprise the negative carbon holder, 7, the gas check, 6, and the slidable positive carbon holder, 8. These parts are in substantially perfect alinement, and the lamp is trimmed by inserting, first, the positive, and then the negative carbon pencil through the lower holder, 7, while the globe G, is removed. The construction of the positive carbon holder is novel and very efficient. The holder proper is short in comparison with others, taking hold of the extreme top only of the carbon pencil, and permitting practically all of the pencil to feed through the gas check. The holder cap, 8, has a small opening, 8ᵃ, and a larger, threaded recess, 8ᵇ, in its side. The opening is occupied by a spring-pressed head, 8ᶜ, having a flange or collar, 8ᵈ, that limits its inward movement. The spring cup, 8ᵉ, is screwed into the recess, 8ᵇ, and contains the spring, 8ᶠ; on the end of the cup is a screw, 8ᵍ, for securing the terminal, 14ᵃ, of the cable, 14. On the top of the cap, 8, is a block, 15, secured by screws, 15ᵃ, and having grooved ends, 15ᵇ, that loosely fit against the rods, 2, which latter serve as the guides for the positive carbon holder. The block, 15, is preferably made of porcelain or other material which is non-corrodible. When the positive carbon is pushed up through the gas check, it lifts the holder, 8, until the screws, 15ᵃ, strike the stop-lug, 4ᵇ, on the top plate. The end of the carbon is then forced into the holder, 8, wedging the spring-pressed head or contact, 8ᶜ, outward. The pressure of the head upon the end of the carbon insures an excellent electrical connection between the positive line terminal and the positive carbon pencil. A modified guide for the carbon holder, 8, is shown in Fig. 9, the same comprising a clip, 15ᵈ, insulated from the holder, 8, and containing rollers, 15ᵉ, that engage the guide rods, 2—2.

The carbon pencil clutch comprises a short lever, C, having a ring-like end, 16, containing an opening, 16ᵃ, slightly larger than the carbon pencil. When the free end of the lever is lifted, the ring clamps the pencil and raises it. Said free end of the lever is a yoke containing holes for the pivot screws, 16ᵇ. It will be noted that the underside of the ring has a recess, 16ᶜ, to fit the upper end of the gas check, 6ᶜ, the two parts being brought into alinement when the lever, C, drops to the position shown in Fig. 5. At this time, the gas check holds the ring central so that it does not bind upon the carbon pencil. The clutch device is completed by a link, 16ᵈ, and the lever, C, or said link, is provided with a right-angle stop, 16ᵉ, the foot of which strikes the lever when the lever and link are at right angles, serving to dislodge the ring from the pencil and preventing the free end of the lever from dropping below the level of the gas check top.

The clutch-operating electro-magnet comprises a solenoid of the iron-clad type, adapted to elevate the positive carbon and regulate the space between the positive and negative carbons. The solenoid comprises the iron tube, 17, the brass and iron ends, 17ᵃ and 17ᵇ, the windings of insulated wire 17ᶜ, and the iron sheath, 17ᵈ, together with the core. This core comprises the iron core proper, 18, inclosed within a brass tube, 18ᵃ and joined to the clutch link, 16ᵈ, by an insulating coupling, comprising the metal part, 18ᵇ, the lava insulator, 18ᶜ, and the metal union 18ᵈ, screwed onto the lower end of the brass tube, 18ᵃ. The sheath, 17ᵃ, extends above the windings of the solenoid, and is provided with a metal top, having lugs, 17ᵉ, by which the solenoid is pivotally suspended from a rod or link, 17ᶠ, which hangs from the boss, 4ᶜ, on the top plate, 4. In this manner the solenoid and clutch are suspended from the top plate of the lamp, and the frame rods are wholly relieved from the duty of supporting the same; furthermore, the solenoid being pivotally suspended, automatically adjusts itself to the different positions assumed by the clutch lever, and has no tendency to throw the positive carbon out of line or strongly against one side of the gas check.

Figure 11:
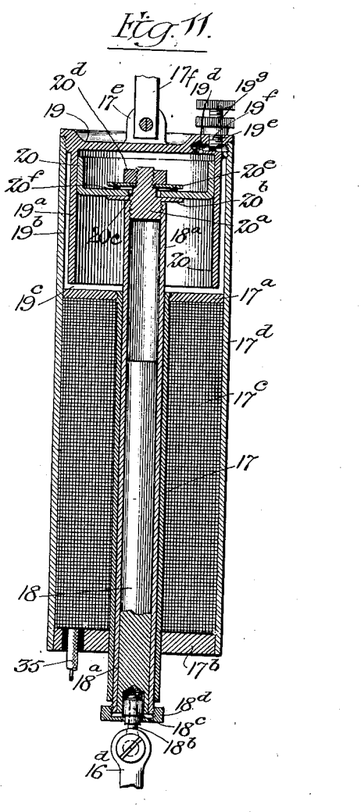
Fig. 11 is an enlarged, vertical section of the clutch-operating solenoid, showing the solenoid dash-pot in detail.
Figure 12:
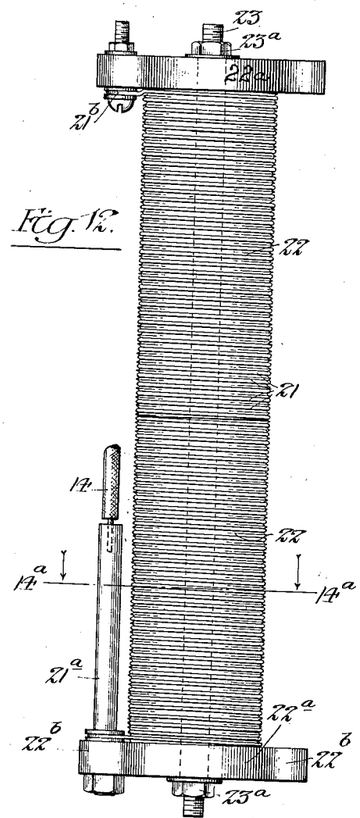
Fig. 12 is an enlarged detailed view of the resistance member of the lamp.

The solenoid dash pot is differentiated from others by being made a part of the solenoid structure and by other features of novelty. Referring to Fig. 11, it will be seen that the cap, or plug, 19, having lugs, 17ᵉ, is in reality an inverted cup of slightly less length than the cavity in the upper part of the sheath 17$^d$. The walls, 19$^a$, of the cup, are separated from the sheath, 17$^d$, leaving an annular space, 19$^b$. There is also an opening, 19$^c$, between the lower edge of the dashpot cup or cylinder and the top, 17$^a$ of the solenoid. In the upper part of the plug or dash pot cylinder is a by-pass, 19$^d$, connecting the space, 19$^b$, with the interior of the cylinder. Said upper part also contains a threaded hole, 19$^e$, which is occupied by a regulating screw, 19$^f$, whereof, 19$^g$, is a locking nut. By turning the screw, the capacity of the opening may be increased or decreased to control the exit of the air from the dash pot cylinder. The dashpot piston is a metal disk or cup, 20, turned to loosely fit the cylinder. The piston is secured upon the upper end of the brass core-tube, 18$^a$ in such manner as to make a tight joint therewith upon the upward stroke of the solenoid core. Although not a requisite of my invention, the piston is preferably constructed in such manner as to permit the air to bypass directly from the upper to the lower part of the cylinder, instantly upon the commencement of and during the downward stroke of the solenoid core. The preferable construction for this portion of my lamp includes a part, 20$^a$, having a large, threaded end, which closes the upper end of the tube, 18$^a$. The part, 20$^a$, has a wide flange, 20$^b$, upon which the piston rests. The opening, 20$^c$, in the piston, is larger than the shank of part 20$^a$, and the reduced upper end of said part, 20$^a$, carries a nut, 20$^d$, and a washer, 20$^e$, the latter being held firmly upon the shoulder of 20$^a$. The washer, 20$^e$, has three or more points, 20$^f$, on its under side, and the distance between these points and the flange, 20$^b$, is slightly greater than the thickness of the piston, 20. On the upward stroke of the solenoid core, the air trapped in the top of the dash pot presses the cup piston upon the flange, 20$^b$, making the joint tight. The air, is therefore, forced to find its escape through the small by-pass, 19$^d$, into space, 19$^b$. On the downward stroke of the solenoid core, the points, 20$^f$, will drop upon the piston, 20, and the flange, 20$^b$, will drop away from said piston, thereby leaving a tortuous passage open through the center of the piston. As a result, the air that may be trapped beneath the piston does not specially check its fall. The distinct advantage of this dash pot is that being in the upper end of the solenoid casing or sheath, and having no communication with the external atmosphere except to a slight extent through the solenoid tube, the dash pot is protected from the weather, moisture, dust and insects. Neither moisture nor fumes will rise through the solenoid tube, the latter being occupied by the core, and my novel dash pot is not subject to corrosion. It should be noted that the dash pot piston operates upon a small body of air that is confined within the solenoid sheath and which is kept dry by the heat of the solenoid. Inasmuch as the size of the by-pass, 19$^d$, determines the speed with which the solenoid core will ascend when the solenoid is energized, it will be obvious that the lamp may be perfectly and accurately regulated through the agency of the screw, 19$^f$, and that such regulation may take place at any time, even while the lamp is in operation. The turning of the screw by determining the rapidity with which the confined volume of air may be transferred from one end of the dash pot cylinder to the other, determines the operating speed of the solenoid core and the lamp clutch. The parts of the piston as here constructed cannot clog or stick and the central opening or valve of the piston cannot in any way remain open on the up stroke; and all pumping or chattering of the carbons is therefore obviated.

Figure 13:
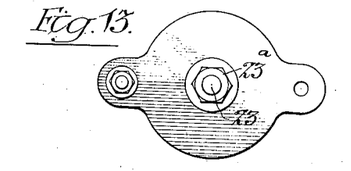
Fig. 13 is an end view of said member.
Figure 14:
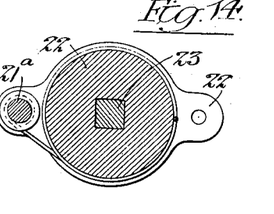
Fig. 14 is a sectional view on the line $14^a$—$14^a$ of Fig. 12, Figs. 15, 16 and 17 are sectional details illustrating the different ways of hanging or supporting the lamp.
Figure 15:
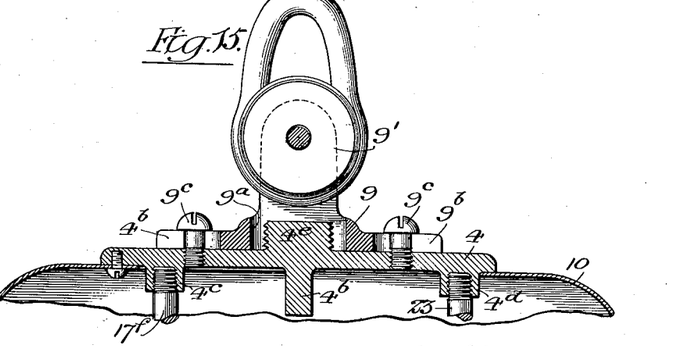

The resistance member of the lamp comprises a continuous piece of low temperature co-efficient wire, 21, wound upon spool of insulating material, which hangs from the plate, 4. In this connection, it should be noted that the solenoid, S being heavier than the resistance member, R, is hung from a point on the plate nearer the center thereof than the resistance member. Referring to Figs. 1 and 13 it will be seen that the resistance spool is made in two sections, 22—22, the ends of which abut. Each section is provided with a single head, 22$^a$, having perforated ears or lugs, 22$^b$. The body of each section 22, has a spiral groove, in which the resistance wire, 21, is wound. The lower end of the wire is attached to a high binding post, 21$^a$, secured in one of the ears, 22$^b$. The flexible cable, 14, connected with the positive carbon holder, has its other end soldered in the binding post or standard, 21$^a$. The upper end of the resistance wire is fastened to the short binding post, 21$^b$, at the upper end of the spool. The spool sections are provided with square holes to receive the square bolt 23; the ends of the bolt are turned and threaded and the sections of the spool when placed on the shaft, 23, are bound together by the nuts, 23$^a$. The upper, threaded end of the bolt is screwed into the boss, 4$^d$, on the plate, 4, and in this manner the resistance member is supported. It will be obvious that the resistance member may be very easily removed in case it is necessary to repair same. On the upper part of the spool is a split hoop or band of metal 24, adapted to be tightened upon the coils or turns of resistance wire by means of a screw 24$^a$. The screw also serves to secure the terminal piece, 25 of the in-leading cable, 26. The resistance of the lamp may be altered by adjusting the band up or down on the spool. When the band is tightened, it makes an excellent electrical connection with the bare resistance wire. The standard, 21ª, serves not only as part of the connection to the positive carbon, but also performs the office of a stop, to prevent the resistance cut-out band, 24, from being so far lowered upon the spool as to short-circuit the lamp, that is, dangerously reduce the resistance in the lamp circuit.

The lamp binding posts comprise the posts or shanks, 27, insulated within the bushings, 4ᶠ—4ᶠ, provided with flanges, 27' and secured by nuts, 27ª. In one case the nut holds the bare end of the wire or cable, 28, and in the other case, the nut holds the switch jaws or contact pieces, 29. The binding posts are of the usual construction, save as to their upper ends, see Figs. 2 and 2ª. The threaded upper end, 27ᵇ, of the binding post, is provided with a nut, 27ᶜ, having a conical recess, 27ᵈ. Said end is also provided with an inclined hole, 27ᵉ, and the bared conductor wire is thrust through the hole, 27ᵉ, and bent across the top of flange, 27'. The nut is then turned down as shown in Fig. 2ª, serving to crimp and bind the wire firmly in the post.

Figure 17:
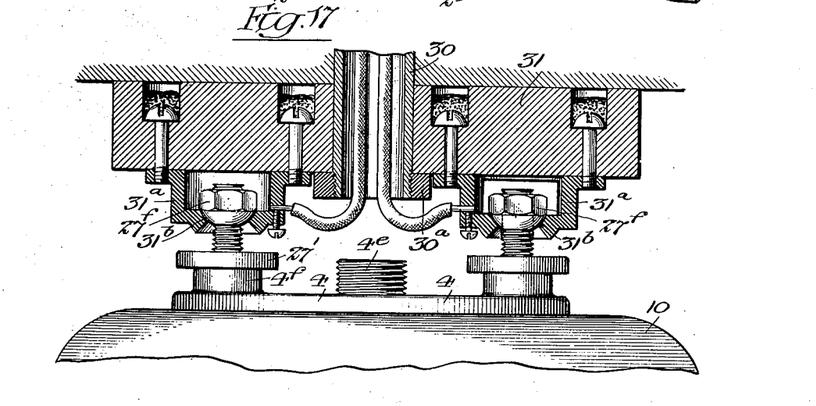

The lamp hangers as before intimated, may take different forms, according to the places in which the lamp is used. In most places, the hanger-block, 9, is used, and said block is particularly valuable because of the opportunity it affords for balancing the lamp. Where a conduit pipe 30 is available, the hanger-block, 9, is removed, and the threaded stud, 4ᵉ, on the top of the lamp is screwed directly into the conduit pipe, or an insulator, as the case may be. The line wires are brought out through holes in the conduit pipe and connected with the binding posts. In places where there is little overhead room for the lamp, I prefer to employ a hanger-board, like unto that shown in Fig. 17. The board comprises a block, 31, of porcelain or like material supported in any suitable manner as by a nut, 30ª, on the lower end of the conduit pipe, 30. The block, 31, carries slotted metal boxes, 31ª, open at opposite ends. In addition to slots in their bottoms, the blocks, 31ª, are provided with depressions, 31ᵇ, to accommodate nuts, 27ᶠ, on the binding posts of the lamp. These nuts are placed on the post and the lamp is then hooked or hung into the boxes. The line connections are made direct to the metal boxes, 31ª, and are permanent, not being disturbed by the mere removal of the lamp from the hanger block.

Figures 4, 5, 6, 7:
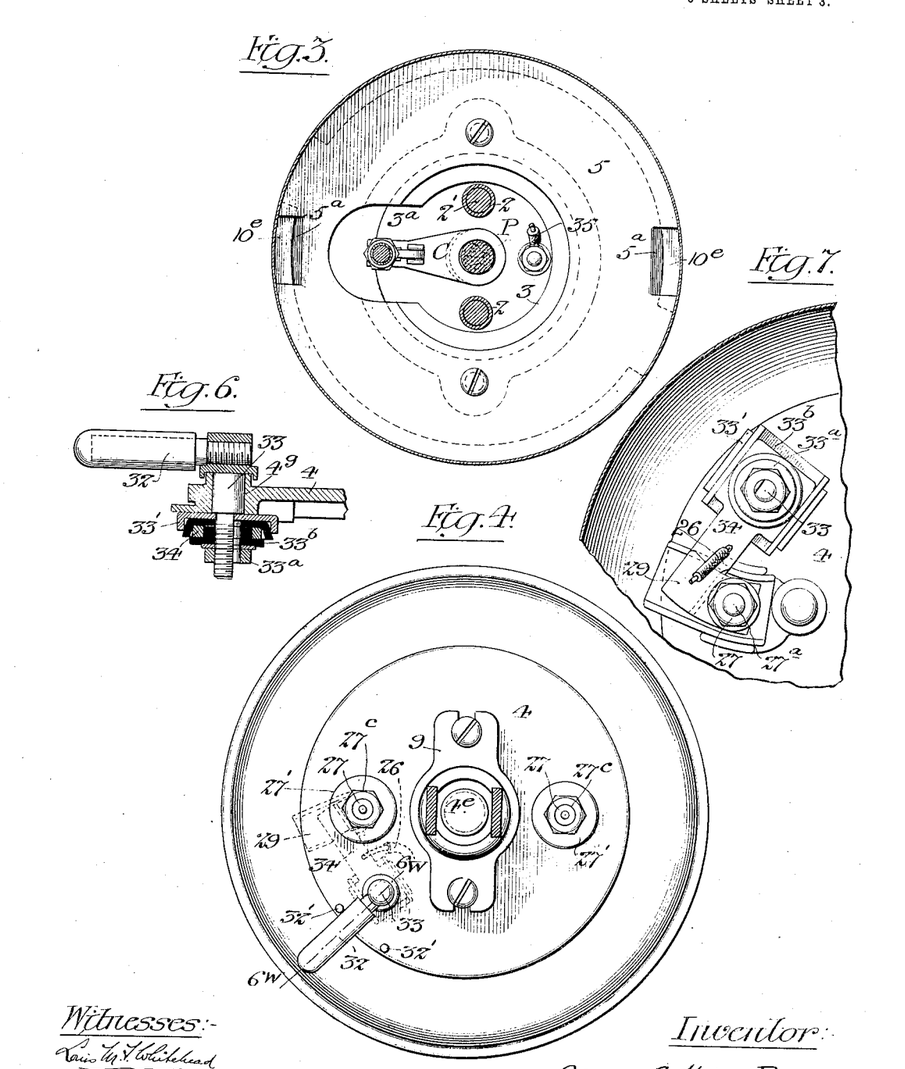
Fig. 4 is an enlarged top view of the lamp, the hanger being broken away, on the line $4^y$—$4^y$ of Fig. 2.
Fig. 6 is a sectional detail of the lamp switch, on the line $6^w$—$6^w$ of Fig. 4.
Fig. 7 is an enlarged plan view of the switch, from beneath.

The lamp switch is arranged upon the top plate of the lamp. See Figs. 4, 6 and 7. 32, is a handle fastened in the upper end of the switch shaft, 33. The lower end of the shaft, 33, is threaded, and is partially cut away or flattened, to receive the channel piece or square washer, 33'. The lower end of the shaft carries a nut, 33ª, and between the nut and the washer, protected by insulating washers and bushings, 33ᵇ, is the switch arm, 34. The end of the switch arm is square, so that it is firmly held in the channel washer, 33'. The free end of the switch arm, 34, is adapted to enter between the jaws, 29, on the lamp binding post, and the flexible cable, 26, is connected to the switch arm. 35 is a connecting wire or cable extending from the negative holder, 7ª, to the solenoid, and 28, is a wire extending from the solenoid to the negative binding post. See Figs. 1 and 2. 32' are stops on the plate, 4, limiting the movement of the switch handle, 32.

The operation of my electric arc lamp, briefly described, is as follows: When the switch is in the position shown by dotted lines in Fig. 4, current will flow, first to the resistance member, passing from the adjustable cut-out band, 24, to the bare resistance wire, and thence to the binding post, 21ª, and through the flexible cable, 14, to the holder, 8, of the positive carbon. At the initial moment the positive carbon will be in contact with the negative carbon, and current will therefore flow through the negative carbon, the holder, 7—7ª, to the wire, 35, and thence to the solenoid. From the windings of the solenoid, current flows through the connection, 28, to the negative binding post of the lamp. Immediately upon the entrance of current to the windings of the solenoid, the same is energized, and the solenoid core is raised. This action, occurring against the resistance and under the control of the dash-pot, results in lifting the carbon clutch and thereby the positive carbon, thus separating the pencils and striking the arc. From this moment on, the positive carbon will be variably suspended by the action of the solenoid until, through the consumption of the carbon, the arc gap becomes excessive and the arc is extinguished. Thereupon the solenoid circuit being broken, its core will drop and cause the clutch to release the positive carbon and permit it to feed downward. As soon as the positive carbon settles upon the negative carbon, the circuit is reëstablished, the solenoid energized, and a fresh arc is formed. The functions and operations of the individual parts of the lamp having been fully stated in connection with the description of their construction will be already understood and may not be repeated.

As it is obvious that numerous modifications of my invention will readily suggest themselves to one skilled in the art, I do not confine the invention to the specific constructions herein shown and described.

Having thus described my invention, I claim as new, and desire to secure by Letters Patent:

1. In an electric arc lamp, a metallic casing containing the arc establishing and regulating magnet, an arc inclosing globe surmounted by a metallic radiator, and a frame formed of thermal and electric insulating material intervening between and connecting the walls of said chamber with said casing.

2. In an electric arc lamp, a frame having top and bottom plates, in combination with parallel rods composed of bolts sheathed in non-corrodible tubes connecting said plates, and a positive carbon holder having an insulated guide part held between said rods, and engaging with said non-corrodible tubes, substantially as described.

3. In an electric arc lamp, a suitable frame bottom, in combination with a gas check in the bottom thereof and extending above the upper surface of said bottom, a clutch lever having a bottom recess to fit the upper end of said gas check and means for operating said clutch lever, substantially as described.

4. A clutch mechanism for arc lamps, comprising a carbon pencil guide, in combination with a clutch lever having a recess to fit upon said guide, said guide serving to center said clutch, and means for lifting said clutch out of engagement with said guide, to elevate a carbon pencil, substantially as described.

5. In an inclosed arc-lamp, the combination of an arc inclosing globe open at its upper end, with a substantially air-tight heat radiating chamber having an opening registering with the globe opening and shaped to have a large exposed surface substantially in the plane of the openings and another substantially in a plane above the same.

6. In an inclosed arc-lamp, the combination of an arc-inclosing globe open at its upper end, with a superimposed substantially air-tight heat radiating chamber having an opening registering with the globe opening and substantially parallel exposed surfaces extending laterally beyond the widest part of the globe.

7. In an inclosed arc-lamp, the combination of an arc-inclosing globe open at its upper end, with a superimposed substantially air-tight heat radiating chamber of large surface relative to its cubical contents, having an opening registering with the globe opening and extending laterally beyond the widest part of the globe.

8. In an inclosed arc-lamp, the combination of an arc inclosing globe open at its upper end, with a superimposed substantially air-tight heat radiating chamber formed of two reversely dished sheets of metal, said chamber having an opening registering with the globe opening and its body extending laterally beyond the widest part of the globe.

9. In an inclosed arc-lamp, the combination of an arc inclosing globe open at its upper end, with a superimposed substantially air-tight depositing chamber formed of two shallowly dished metal sheets, said chamber having an opening registering with the globe opening and the outer edge of the chamber projecting laterally beyond the widest part of the globe.

10. In an inclosed arc-lamp, the combination of an arc inclosing globe open at its upper end, with a superimposed substantially air-tight depositing chamber of lenticular form, having in one of its bases an opening registering with the globe opening and its edge extending beyond the widest part of the globe.

11. In an inclosed arc-lamp, the combination of an arc inclosing globe open at its upper end, with a substantially air-tight depositing chamber of metal having substantially the form of a body of revolution produced by an ellipse rotating about its vertically disposed minor axis and the major axis of which is greater than the largest diameter of the globe, said chamber having an opening registering with the globe opening.

12. In an inclosed arc lamp, the combination of a two-part arc-inclosing chamber, one of said parts having walls of transparent or translucent material and the other having walls on all sides exposed to the atmosphere the two parts being in free and unobstructed communication.

13. In an inclosed arc lamp having means for creating a circular air current carrying products of combustion, said means consisting of a two-part arc-inclosing chamber, one of said parts having walls of transparent or translucent material, and the other having walls which on all sides are exposed to the atmosphere, with a free and unobstructed communication between the two parts.

14. In an inclosed arc-lamp, the combination of an arc inclosing globe open at its upper end, with a substantially air-tight heat radiating chamber having an opening registering with the globe opening and shaped to have a large exposed surface substantially in the plane of the openings and another in a plane above the same, and means for dividing the heat radiating chamber into circulating passages substantially as described.

15. In an inclosed arc-lamp, the combination of an arc inclosing globe open at its upper end with a superimposed substantially air-tight heat radiating chamber having an opening registering with the globe opening and substantially parallel exposed surfaces extending laterally beyond the widest part of the globe, and a partition in said heat radiating chamber having a tubular portion depending into said globe substantially as described.

16. In an inclosed arc-lamp, the combination of an arc inclosing globe open at its upper end, with a superimposed substantially air-tight heat radiating chamber having an opening registering with the globe opening and substantially parallel exposed surfaces extending laterally beyond the widest part of the globe; a metallic casing containing the arc establishing and regulating magnet, and a frame intervening between the upper walls of said chamber and said casing and projecting into the heat radiating chamber, whereby the communicating channel between the latter and the globe is rendered practically annular, substantially as described.

17. In an inclosed arc-lamp, the combination of a two-part arc inclosing chamber, one of said parts having walls of transparent or translucent material and the other having walls on all sides exposed to the atmosphere, the two parts being in communication through an annular passage.

In testimony whereof, witness my hand this 19th day of November, 1904, at Chicago, Cook county, Illinois, in the presence of two witnesses.

OSCAR ARTHUR ROSS.

Witnesses:
CHARLES GILBERT HAWLEY,
JOHN R. LEFEVRE.